United States Patent [19]
Diehl

[11] 3,892,512
[45] July 1, 1975

[54] TRANSFER MOLDING APPARATUS WITH RESILIENT PAD TO DISTRIBUTE MOLDING PRESSURE

[76] Inventor: Alan V. Diehl, 11144 Wystone Ave., Northridge, Calif. 91324

[22] Filed: Sept. 13, 1973

[21] Appl. No.: 396,698

[52] U.S. Cl. ...... 425/251; 425/DIG. 228; 249/66 A; 425/437; 425/438
[51] Int. Cl............................................ B29h 3/12
[58] Field of Search.......... 425/250, 437, DIG. 228, 425/DIG. 58, 438, 168, 251; 249/66 A, 66 C

[56] References Cited
UNITED STATES PATENTS
| | | | |
|---|---|---|---|
| 2,959,818 | 11/1960 | Diehl et al. | 425/437 X |
| 3,121,918 | 2/1964 | Jurgeleit | 425/DIG. 228 X |
| 3,360,829 | 1/1968 | Germ | 425/DIG. 228 X |

Primary Examiner—Francis S. Husar
Assistant Examiner—David S. Safran
Attorney, Agent, or Firm—Robert E. Geauque

[57] ABSTRACT

A molding apparatus which includes upper and lower mold sections movable from a together position to a spaced apart position, each mold section including a mold cavity, one of the molding cavities within a molding section being located within a block, that block being movable relative to its respective molding section, the block being biased by a rubber pad toward engagement with the other molding cavity, a core means connected to a molding section and located within the molding cavity, the core means including means to eject the completed molded part by means of air pressure from the core means.

10 Claims, 7 Drawing Figures

3,892,512

SHEET 1

3,892,512

SHEET 2

3,892,512

SHEET 3

TRANSFER MOLDING APPARATUS WITH RESILIENT PAD TO DISTRIBUTE MOLDING PRESSURE

BACKGROUND OF THE INVENTION

The molding of small objects is the application normally thought of when plastics and rubber are mentioned. Molding involves filling a mold cavity with a fluidized plastic or rubber which is then allowed to cure to produce a solid object. There are normally used three types of molding techniques, transfer molding and injection molding and compression. The molding material is cured and the mold separated and the molded parts removed.

In injection molding the raw material is placed in a hopper from which it is fed in a predetermined quantity to a heated chamber located in front of a hydraulically operated piston. After the mold is closed, the plunger forces the raw material through the heated chamber which fluidizes the raw material, then through a nozzle into the sprue in the front half of the mold and on through passageways into the mold cavities. In both transfer molding and injection molding, multicavity molds are used. In most instances the injection molding technique has been preferable because of its capability of high production rates and also the fact that the entire injection molding cycle can be made semi-automatic.

When the material being molded is plastic, the halves of the mold need not fit together nearly as tight as is required when rubber is being molded. Rubber has the capability of flowing into the tiniest crack whereas plastic does not have this capability. As the mold is used, the mold halves do wear and minute cracks between the halves will result. In the forming of plastic, these minute cracks are not significantly damaging. However, when rubber parts are molded, the rubber will flow into these cracks, thereby requiring substantial finishing operations. When multicavity molds are used which is normally the case, this wearing of the mold halves is compounded. Also, to construct the mold halves to be perfectly tight has been in the past very difficult to accomplish. However, previously, an injection molding apparatus can be manufactured to a higher degree of accuracy than a transfer molding apparatus.

SUMMARY OF THE INVENTION

The principal objective of this invention is to employ a design of a transfer molding apparatus wherein the molding of rubber can be accomplished wherein the molded part is formed substantially flash free, thereby not requiring any finishing operations.

The molding apparatus of this invention employs an upper molding element and a lower molding element with the upper molding element including a fixed upper cavity portion and the lower molding element including its cavity portion mounted in a block which is movable with respect to the lower molding section. This block is connected to a resilient rubber pad mounted within the lower molding section. This resilient rubber pad provided a continuous biasing force tending to bias the block toward the molding cavity of the upper molding section. Therefore, when the molding sections are together and the fluidized raw material is conducted within the molding cavity, each pair of molding cavities within the multicavity mold have tightly sealed edges thereby not permitting the flow of any of the molding material exteriorly of the mold cavity. As mold cavities wear, due to the biasing force of the rubber pad and because it is applied individually to each pair of molding cavities, each mold cavity remains tightly sealed thereby not permitting any flash to be formed about the molded part.

A core means is to be attached to the upper molding section and extend within the mold cavity. The core means includes a valve with the valve normally being closed. After the parts have been molded and the upper mold section moved in respect to the lower mold section, a quantity of pressurized air is conducted to each valve of each core. This results in the molded part to be ejected from the core thereby eliminating considerable time and effort to manually strip the molded parts from the core.

DETAILED DESCRIPTION OF THE SHOWN EMBODIMENT

In transfer molding the mold generally has three parts to it, (1) the bottom cavity plate; (2) the top cavity plate which has a "pot" milled in its top side, and (3) a plunger (or ram) which fits the "pot" with minimum operating clearance of 0.002–0.0003 inch. The raw rubber is placed in the "pot". As the press is closed, the plunger or ram enters the pot and forces the rubber through the sprues and gates into the cavity.

Figure 1:
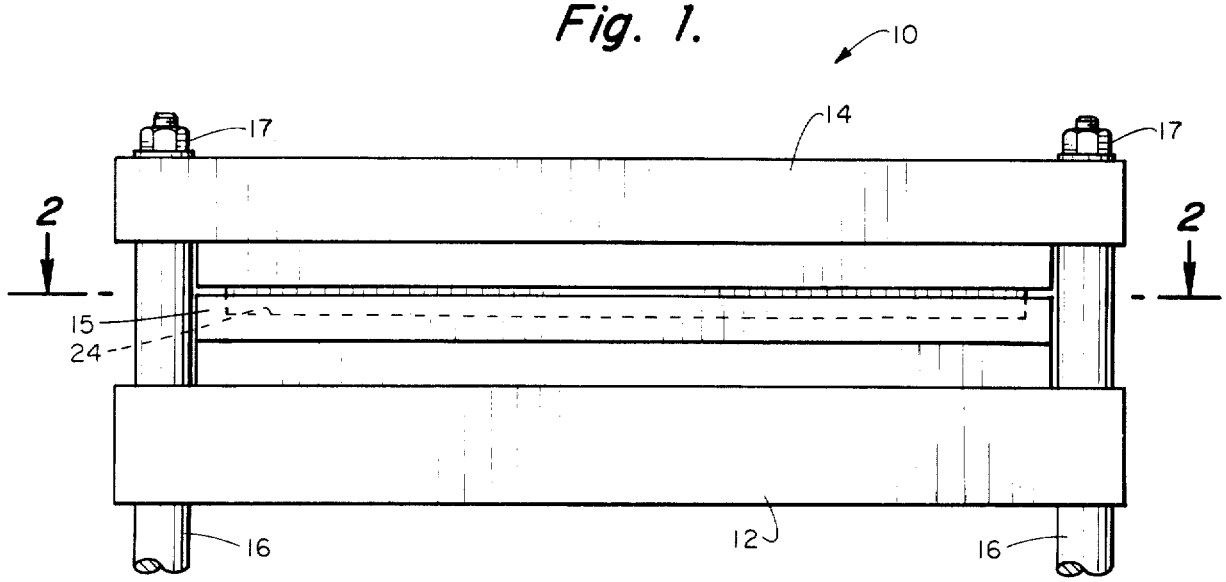
FIG. 1 is a side elevational view of the molding apparatus of the present invention as it would be incorporated in the platens of a hydraulic press.
Figure 2:
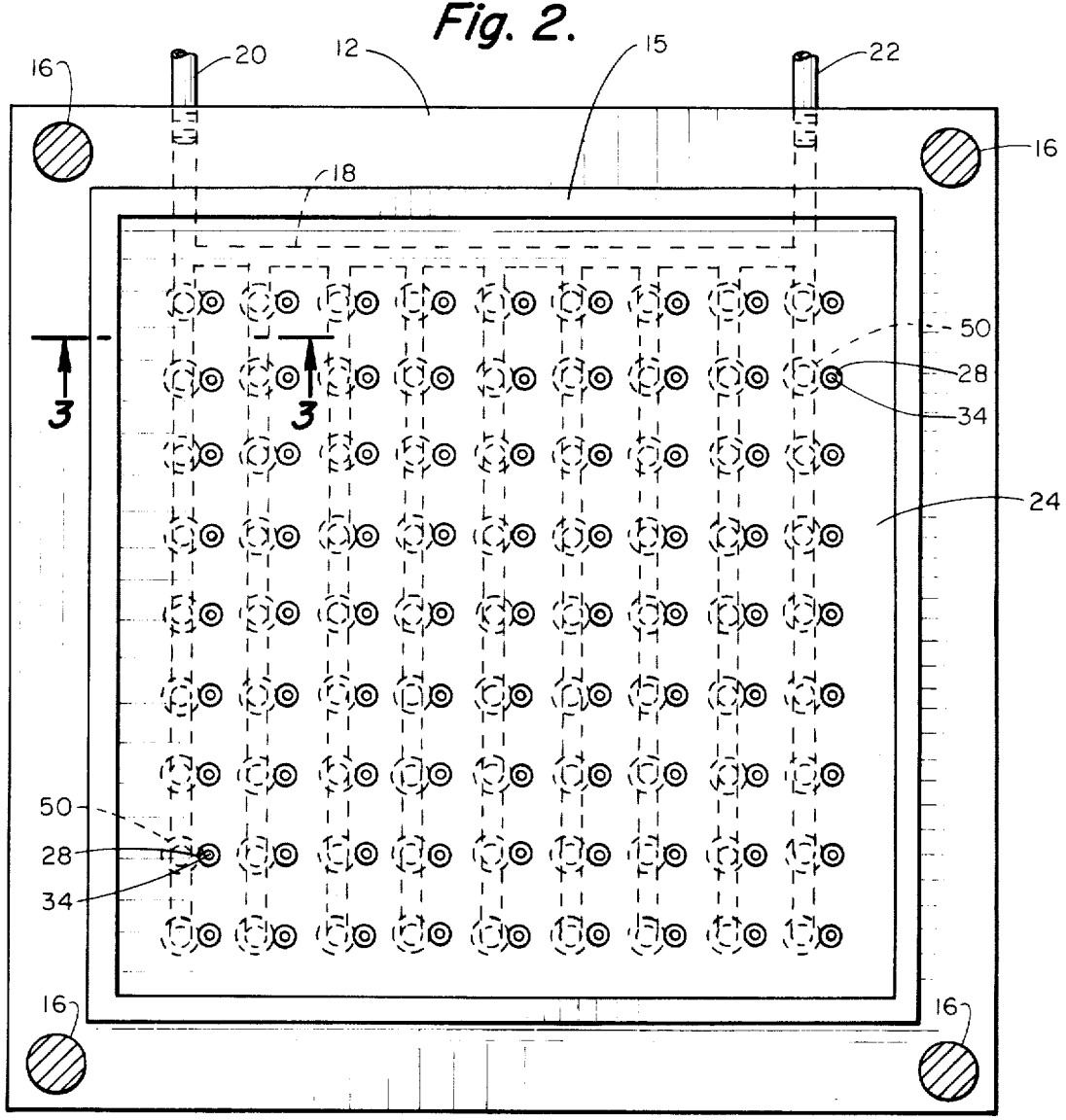
FIG. 2 is a cross-sectional view of the molding apparatus of this invention taken along line 2—2 of FIG. 1.

Referring particularly to the drawings, there is shown in FIG. 1 a conventional hydraulic molding press 10 having a movable platen 12 and a fixed platen 14. The platen 12 is movable between the upper position or a together position with the fixed platen 14, and a downward position which is spaced from the platen 14. The platen 12 is guided by a plurality of rods 17 which normally comprises a rod 16 positioned at each corner of the hydraulic press 10. The platen 14 has openings for receiving the ends of the rod 16 so that the platen 14 can be rigidly attached to the rod 16 by means of nuts 17.

Slidably supported within the platen 14 is a pot plate 15. The pot plate is removable from the platen 14 when the press 10 is open. The structure to effect the removal of plate 15 is not shown and forms no direct part of this invention but is deemed to be conventional. The plate 15 includes a maniflod section comprising a plurality of pressurized air supply passages 18. Pressurized air is to be supplied from a source (not shown) through the inlets 20 and 22 to the passageways 18.

Formed within the upper surface of the pot plate 15 is a raw material supply chamber 24. Raw rubber material 26 is to be placed within a chamber 24 with a hydraulic ram to exert force thereon tending to move the fluidized raw material into sprues 28.

Fixedly connected to the underside of the pot plate is a plate 30. Plate 30 is connected to the pot plate 15 by means of bolts 32. Formed through the plate 30 are a plurality of spaced apart openings 34. An opening 34 is to be in alignment with the sprue 28 and permit passage of the fluidized raw material therethrough. Also formed through the plate 30 are a plurality of spaced apart valve apertures 36. Each valve aperture 36 communicates with an air supply passage 18.

Fixedly connected to the underside of the plate 30 are a plurality of cores 38. The resultant molded part 40 is to have a central interior core which will be formed by the core 38. The molding apparatus of this invention has been found to be particularly desirable in making the rubber plunger portion of a hypodermic syringe and this is the molded part 40 shown. However, it is considered to be within the scope of this invention that other molded parts courl be readily manufactured by the apparatus of this invention.

Each core 38 is fixedly secured to the plate 30. Each core 38 includes a central passage way 42. The passageway 42 has a flared end 44 at its outermost extremity. A valve stem 46 extends through the passage 42 with the valve stem 46 terminating in a release valve 48. The release valve 48 is to matingly cooperate with the flared end 44 and effect a closing of the passageway 42.

The valve stem 46 extends within the opening 36 and is connected to a valve seat 50. The valve seat 50 extends within a chamber 52 which is connected directly to a passageway 18. The valve seat 50 has an annular shoulder 54 which is adapted to form a tight connection with beveled edge 56 of the passage 36. A spring 58 surrounds a portion of the stem 46 and is in abutting contact with the seat 50 and a portion of the plate 30. The spring 58 functions to exert biasing force to hold the release valve 48 in contact with the flared end 44.

Figure 5:
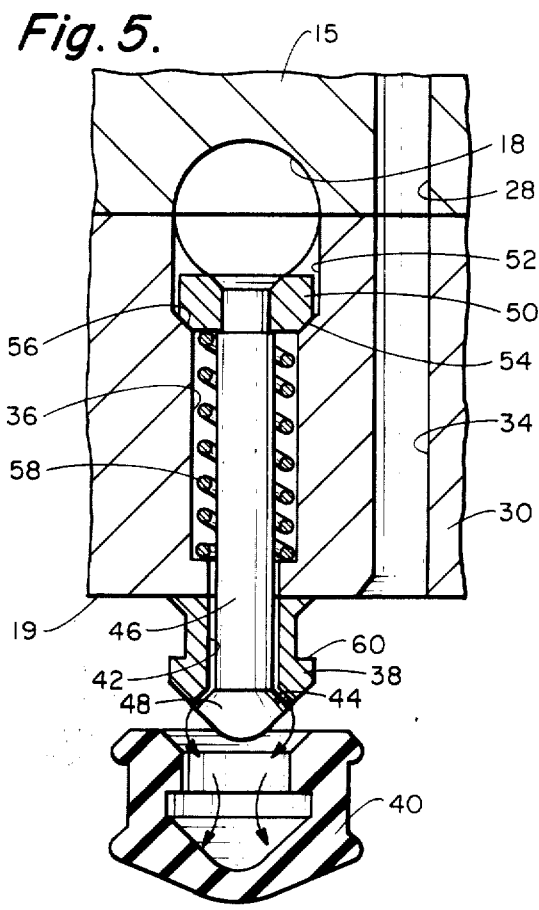
FIG. 5 is a view similar to FIG. 4 but showing the molded part being ejected from the core and the valve in the open position.

When the molded part 40 has been formed and the platen 12 spaced from the plate 15, air under pressure is supplied through the inlets 20 and 22 into the passageways 18. This pressurized air is conducted from the passageway 18 to each of the chambers 52 and through the annular space surrounding the valve seat 50 and into the area where the spring 68 is located. This pressurized air is then conducted about the stem 46 and into contact with the release valve 48. This causes the release valve 48 and the stem 46 to be moved longitudinally to the position shown in FIG. 5 of the drawings. Once the release valve 48 is moved to this position, the valve seat 50 comes into contact with the edge 56 thereby closing such and not permitting passage of pressurized air therethrough. However, sufficient pressurized air has been supplied to slightly move the molded part 40 to begin sliding such over the shoulder 60 of the core 38. At the same time this supply of pressurized air is then conducted past the release head 48 and exerts an ejecting force upon the molded part 40. As a result, the molded part 40 is quickly ejected from the core 38 thereby not requiring manual removal of the molded part.

Figure 4:
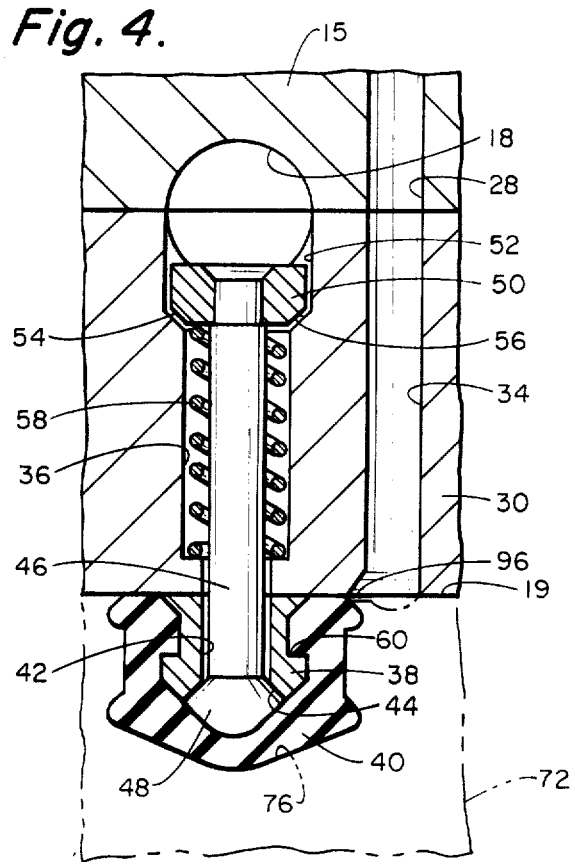
FIG. 4 is an enlarged cross-sectional view of a core means and its cooperating valve showing the valve in a normally closed position.

Once the molded part 40 is removed, leakage of the pressurized air past the release head 48 is permitted due to the cooperation of the valve seat 50 with the edge 54. The source of pressurized air is then shut off and the valve stem 46 is returned to the position shown in FIG. 4 of the drawings with the release valve 48 cooperating with the beveled edge 44.

Many parts cannot be injection molded because of air trapping. In this system an air ejection circuit is to be used to exhaust air from the cavities by connecting (during the molding period) this circuit to a vacuum source. The vacuum is drawn in passageways 18 and through chambers 52 and annular space surrounding valve seat 50 and into contact with valve 48. The valve 48 is moved tightly into engagement with core 38 but sufficient leakage occurs around valve 48 to substantially evacuate the molding chambers. This then eliminates the need for intentional grooves at the parting line 19 to exhaust air where we are trying to obtain as good a seal as possible in order to prevent flash. Note that the structure of this invention could be used in an injection mold in a similar manner.

Formed within the lower section 12 is an enlarged chamber 62. Mounted in the bottom of the chamber 62 is a pad 64 of resilient material. The pad 64 will normally take the form of a semi-elastic material such as silicone rubber. Placed against the pad 64 are a plurality of intermediate blocks 66. The blocks 66 can be basically circular or polygonal in cross-section and each one is mounted in an opening 89 formed in plate 69. In a multicavity mold there will be a series of the intermediate blocks 66 arranged in a row with there being a plurality of rows of the blocks 66.

A longitudinal aperture is formed within the plate 69 and includes a lineal heater 74 which is used to cure the material 26 after it has flowed entirely within the mold cavity 76 located within each of the blocks 72. Similar lineal heaters 74 are arranged throughout the molding apparatus in order to insure that the molding material 26 is entirely cured.

The cavity inserts 72 are located with apertures formed within a lower plate 80. The plate 80 is threadedly attached to the lower molding section 12 by means of screw fasteners 82. Portions of the plate 80 are located about each of the inserts 72 and functions to separate an insert 72 from another insert 72. It is to be noted that the screws 82 permit a certain amount of movement of the plate 80 with respect to the member 12 as is readily apparent to the inclusion of gap 84 located between the member 12 and the plate 80. The function of the gap 84 will be explained further on in the specification.

The plate 80 is also fixedly secured through a bolt fastener 86 to plate 96. Each opening 89 has an enlarged recess 90 connecting therewith. The recess 90 cooperates with a shoulder 92 formed upon each of the blocks 66. It is to be noted that the height of the shoulders 92 is less than the height of the recesses to thereby form a gap 94 therebetween with the molding apparatus in a state of rest.

Figure 3:
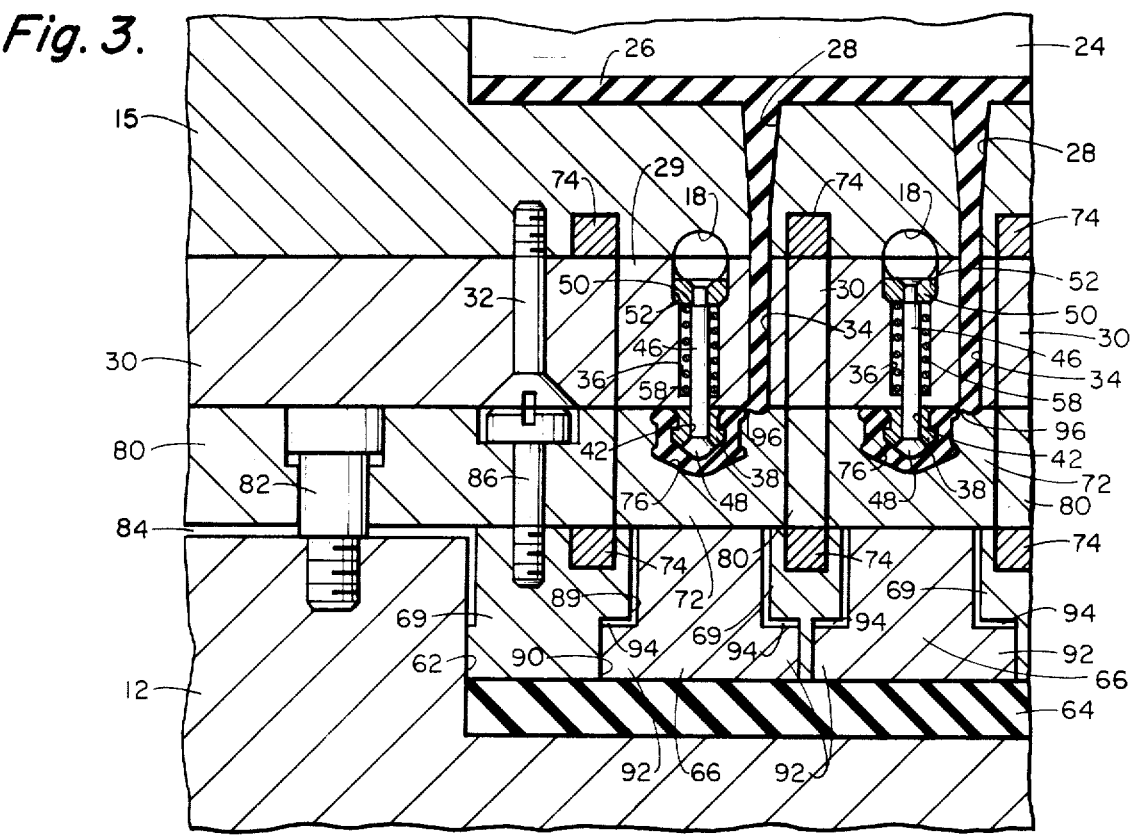
FIG. 3 is a cross-sectional view through the molding apparatus of this invention taken along line 3-3 of FIG. 2.

With the apparatus 10 of this invention in the just closed position which is shown in FIG. 3 of the drawings, the rubber pad 64 exerts a biasing force against the plate 69 and each of the blocks 66. As the apparatus 10 of this invention is closed to a tighter position, the plate 80 tends to come against the member 12, thereby closing the gap 84. When this occurs, the plate 69 is pushed down into the pad 64. The biasing force of pad 64 is equally distributed to each block 66. The springing force from each of the blocks 66 is transferred to its respective insert 72 which contains the mold cavity 76. This forces each of the inserts 72 into an extremely tight relationship with the upper cavity inserts 29 which contain the sprue 34. A gate 96 is formed a few thousandths of an inch wide so as to provide access of the fluidized material from the aperture 34 into the molding cavity when the lower cavity inserts 72 are in tight engagement with the upper cavity inserts 29. With the molding apparatus 10 in the completely closed position, the fluidized material from the chamber 24 is forced through the sprue 28 into the aperture 34 and through the gate 96 into the molding cavity 76.

Due to the function of the pad 64, an individual equalized biasing force is transferred to each of the inserts 72 which thereby forces each of the inserts 72 into tight engagement with its respective upper cavity insert 29. Therefore, due to small errors in tolerances during manufacturing or gaps which arise due to wear, each mold cavity is assured of being perfectly tight during molding thereby eliminating the forming of flash on the parts which are molded within the molding cavity 76. The gaps 94 are provided so as to permit the slight movement of the blocks 66 with respect to the plate 89.

Figure 6:
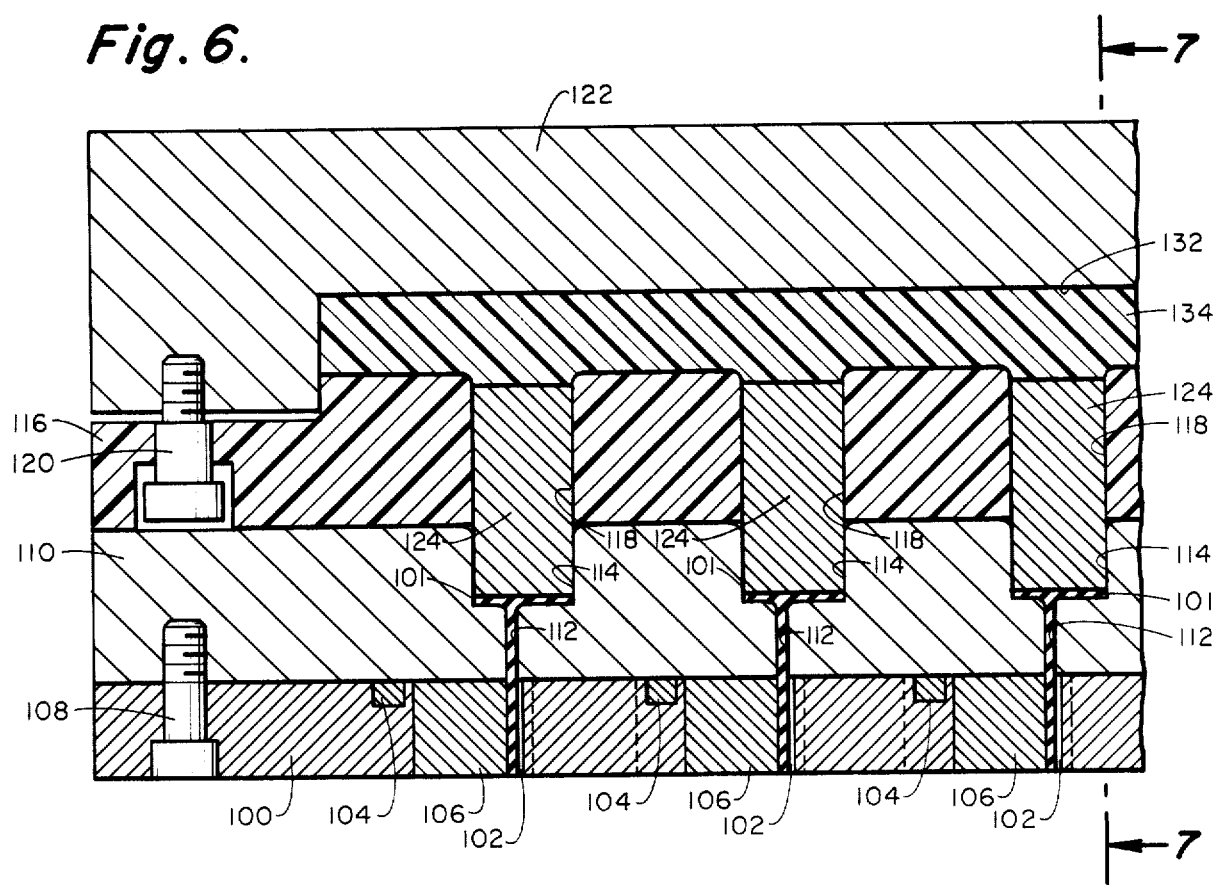
FIG. 6 is a cross-sectional view of a modified form of the molding apparatus of this invention.
Figure 7:
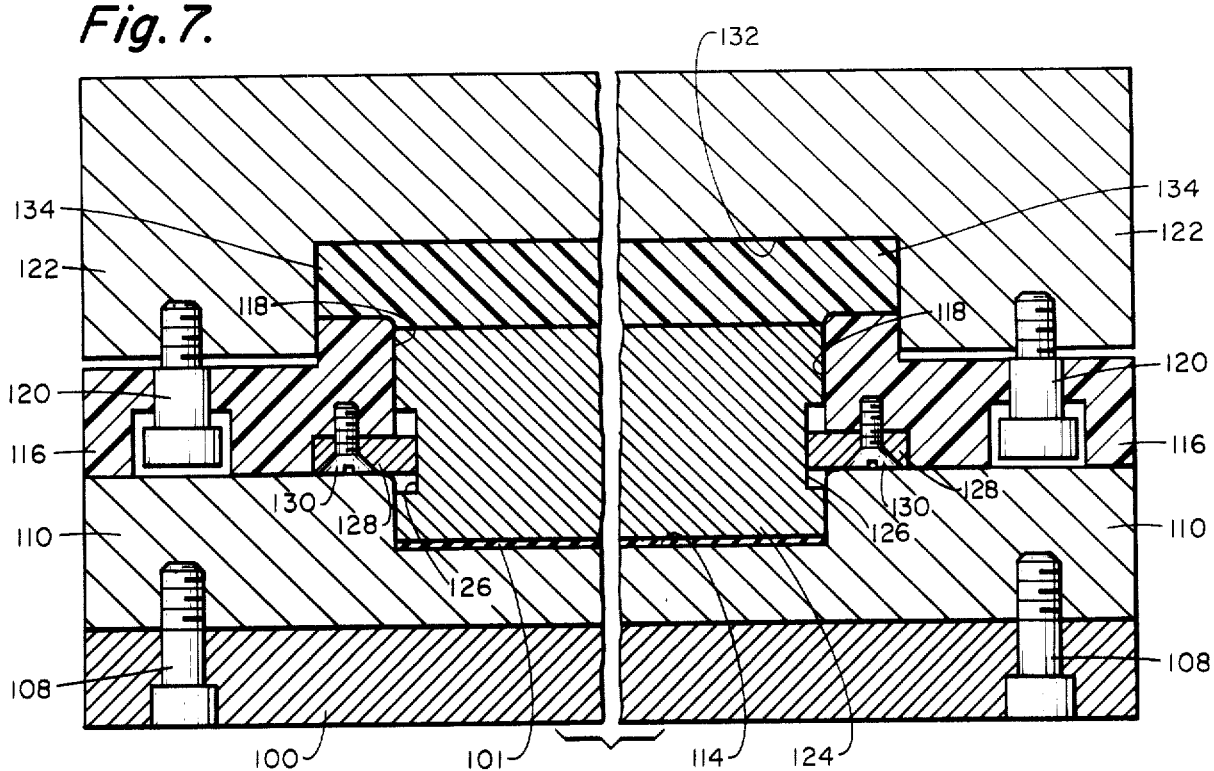
FIG. 7 is a cross-sectional view taken along line 7—7 of FIG. 6.

Referring in particular to FIGS. 6 and 7 of the drawings, there is shown an upper molding plate 100 which is basically the equivalent of plate 30 within FIG. 3. Within plate 100 is formed sprues 102 through which the rubber molding material 101 is to be conducted to the molding cavity. Plate 100 includes lineal heaters 104 which are basically similar and function in the same manner as heaters 74. Mounted within the plate 100 are a plurality of upper cavity inserts 106. The upper cavity inserts 106 are basically similar to the cavity inserts 29 shown in FIG. 3 and function in the same manner.

The plate 100 is attached by bolts 108 to a plate 110. Plate 110 is constructed on a rigid material such as steel or the like. Sprue openings 112 are formed within the plate 110 and are to communicate with the sprue openings 102. Also formed within the plate 110 are a plurality of channel-shaped openings 114. The openings 114 are laterally spaced apart a predetermined distance. Each channel-shaped opening 114 is to communicate with a row of openings 112.

Located above plate 110 is another plate 116. Plate 116 is to be formed of a rigid material such as steel formed within the plate 116 is a plurality of longitudinal openings 118. An opening 118 is to cooperate and be in direct alignment with a channel-shaped opening 114. The plate 116 is mounted by bolts 120 to a plunger 122. The plunger 122 and plate 116 are movable with respect to the plate 110.

Located within each of the openings 118 is a metal block 124. The metal block 124 includes a groove 126 formed on each side thereof. Within each groove 126 is positioned a stop block 128. Each of the blocks 128 is fixed to the plate 116 by means of a fastener 130. The length of each of the grooves 126 is greater than the width of the block 128. As a result, each of the blocks 124 is capable of moving a limited distance determined by the length of the grooves 126 with respect to the plate 116.

Located within the plunger 122 is an enlarged chamber 132. Within the enlarged chamber 132 is to be located a pad 134 of resilient material such as a resilient plastic 30–60 shore silicone.

Material which is to form the molded parts 40 is positioned in strips within the channel-shaped openings 114. The plunger 122 and the plate 110 are then moved together so that the blocks 124 cooperate within the openings 114 causing a squeezing of the molding material within the openings 114 causing such to be conducted through openings 112 and sprues 102 and hence into the molding cavities. By the use of the pad 134 equal distribution of force is applied to each of the blocks 124 thereby insuring equal filling of each of the molding cavities.

What is claimed is:

1. Molding apparatus for producing a molded material comprising:

upper and lower mold sections movable relative to one another between a together position and a spaced apart position, each of said mold sections having a cavity portion which forms a closed cavity when said mold sections are in said together position, said cavity portion of said lower mold section being formed within a lower cavity insert, said insert being movable in respect to said lower mold section, said insert being movable toward said upper mold section;

an enlarged chamber formed within said lower mold section;

a biasing means taking the form of a pad of resilient material connected to said insert located within said enlarged chamber for exerting a force against said insert tending to move such toward said upper mold section; and an intermediate block interconnecting said insert and said pad, said intermediate block being movable relative to said lower mold section, whereby the cooperation between said intermediate block and said insert functions to maintain even firm contact between said insert and said upper mold section.

2. The molding apparatus as defined in claim 1 wherein:

core means located within said closed cavity and movably supported by said upper mold section, said core means having a passage extending therethrough, means for supplying a working fluid to said passage with said mold sections in said spaced apart position, valve means normally closing said passage and operable by said working fluid to open said passage and cause the working fluid to move said core means downwardly away from said upper mold section in order to strip the molded material from said upper mold section and then to remove the molded material from said core means.

3. The molding apparatus as defined in claim 2 wherein:

spring means connected between said valve and said upper mold section, said spring means applying a force against said valve means tending to maintain such in the normally closed position.

4. The molding apparatus as defined in claim 3 wherein:

said valve means includes an elongated stem extending from said passage, said stem being connected at one end to a valve seat and at the other end to a release valve, said release valve being mounted within said core means, said stem extends within an opening in said upper mold section, said spring surrounds said stem and is located between a portion of said upper mold section and said valve seat, with said valve means in said normally closed position said valve seat being spaced from the wall of said opening in said uppermost section, said valve seat being located within an air supply chamber, with said valve means in said normally closed position the pressurized air within said pressurized air chamber is capable of being conducted about the periphery of said valve seat and through said opening and said passage and into contact with said release valve.

5. The molding apparatus as defined in claim 1 wherein:

said upper mold section including a raw material cavity assembly, said raw material cavity assembly comprising a plurality of longitudinal spaced apart recesses, a sprue interconnecting each said closed cavity with a said longitudinal recess; and a block located within each said longitudinal recess, said block being movable during movement of said mold sections to said together position causing a forcing of raw material within said longitudinal recess through said sprue and into said closed cavity.

6. Molding apparatus as defined in claim 5 wherein:

said upper section including a resilient pad of material, each of said blocks located within each of said longitudinal recesses being in contact with said resilient pad of material when said molding sections are in said together position, whereby a biasing force exerted by said resilient pad of material is evenly distributed to each of said blocks to evenly force the raw material within each of said longitudinal recesses through said sprues.

7. Molding apparatus as defined in claim 6 wherein:

each of said blocks being mounted within a first plate by movement limit means, said first plate being connected to said upper mold sections, said movement limit means comprises a groove means formed within each said block, a stop plate means fixedly connected to said first plate and extending within said groove means, whereby the length of said groove means determines the amount of longitudinal movement of said block with respect to said first plate.

8. Molding apparatus for producing molding material comprising:

upper and lower mold sections movable relative to one another between a together position and a spaced apart position, each of said mold sections having a cavity portion which forms a closed cavity when said mold sections are in said together position;

said upper mold section including a raw material cavity assembly, said raw material cavity assembly comprising a plurality of longitudinal spaced apart recesses, a sprue interconnecting each said closed cavity with a said longitudinal recess; and a block located within each said longitudinal recess, said block being movable during movement of said mold sections to said together position causing a forcing of raw material within said longitudinal recess through said sprue and into said closed cavity.

9. The molding apparatus as defined in claim 8 wherein:

said upper section including a resilient pad of material, each of said blocks located within each of said longitudinal recesses being in contact with said resilient pad of material when said molding sections are in said together position, whereby a biasing force exerted by said resilient pad of material is evenly distributed to each of said blocks to evenly force the raw material within each of said longitudinal recesses through said sprues.

10. Molding apparatus as defined in claim 9 wherein:

each of said blocks being mounted within a plate by movement limit means, said plate being connected to said upper mold section, said movement limit means comprises a groove means formed within each said block, a stop plate means fixedly connected to said first plate and extending within said groove means, whereby the length of said groove means determines the amount of longitudinal movement of said block with respect to said first plate.

* * * * *